(12) United States Patent
Barik et al.

(10) Patent No.: US 10,748,237 B2
(45) Date of Patent: *Aug. 18, 2020

(54) ADAPTIVE SCHEDULING FOR TASK ASSIGNMENT AMONG HETEROGENEOUS PROCESSOR CORES

(71) Applicant: Intel Corporation, Santa Clara, CA (US)

(72) Inventors: Rajkishore Barik, Santa Clara, CA (US); Tatiana Shpeisman, Menlo Park, CA (US); Brian T. Lewis, Palo Alto, CA (US); Rashid Kaleem, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,965

(22) Filed: Nov. 9, 2018

(65) Prior Publication Data

US 2019/0080429 A1 Mar. 14, 2019

Related U.S. Application Data

(63) Continuation of application No. 14/583,247, filed on Dec. 26, 2014, now Pat. No. 10,186,007.

(Continued)

(51) Int. Cl.
*G06T 1/20* (2006.01)
*G09G 5/00* (2006.01)
(Continued)

(52) U.S. Cl.
CPC .............. *G06T 1/20* (2013.01); *G06F 3/14* (2013.01); *G09G 5/001* (2013.01); *G09G 5/363* (2013.01); *G09G 2360/08* (2013.01)

(58) Field of Classification Search
CPC ......... G06T 1/20; G06T 15/005; G09G 5/001; G09G 2360/08
(Continued)

(56) References Cited

U.S. PATENT DOCUMENTS 8,284,205 B2 * 10/2012 Miller .................. G06F 1/3203
345/502
8,707,314 B2 * 4/2014 Gummaraju .......... G06F 9/5044
718/102

(Continued)

*Primary Examiner* — Samantha (Yuehan) Wang
(74) *Attorney, Agent, or Firm* — Grossman, Tucker, Perreault & Pfleger, PLLC (57) ABSTRACT

Generally, this disclosure provides systems, devices, methods and computer readable media for adaptive scheduling of task assignment among heterogeneous processor cores. The system may include any number of CPUs, a graphics processing unit (GPU) and memory configured to store a pool of work items to be shared by the CPUs and GPU. The system may also include a GPU proxy profiling module associated with one of the CPUs to profile execution of a first portion of the work items on the GPU. The system may further include profiling modules, each associated with one of the CPUs, to profile execution of a second portion of the work items on each of the CPUs. The measured profiling information from the CPU profiling modules and the GPU proxy profiling module is used to calculate a distribution ratio for execution of a remaining portion of the work items between the CPUs and the GPU.

21 Claims, 5 Drawing Sheets

Related U.S. Application Data

(60) Provisional application No. 62/041,321, filed on Aug. 25, 2014.

(51) Int. Cl.
*G06F 3/14* (2006.01)
*G09G 5/36* (2006.01)

(58) Field of Classification Search
USPC .......................................................... 345/522
See application file for complete search history.

(56) References Cited

U.S. PATENT DOCUMENTS

| | | | |
|---|---|---|---|
| 9,142,004 B2* | 9/2015 | Abiezzi | G06T 1/20 |
| 2016/0055612 A1* | 2/2016 | Barik | G06T 1/20 |
| | | | 345/522 |

* cited by examiner

```
┌─────────────────────────────────────────────┐
│ Provide a pool of work items, the pool      │
│ shared by a plurality of CPUs and a GPU     │
│ 410                                         │
└─────────────────────────────────────────────┘
                     │
                     ▼
┌─────────────────────────────────────────────┐
│ Run a GPU proxy profiling thread on one of  │
│ the CPUs to profile execution of a first    │
│ portion of the work items on the GPU        │
│ 420                                         │
└─────────────────────────────────────────────┘
                     │
                     ▼
┌─────────────────────────────────────────────┐
│ Run a CPU profiling thread on each of the   │
│ CPUs to profile execution of a second       │
│ portion of the work items on each of the    │
│ CPUs                                        │
│ 430                                         │
└─────────────────────────────────────────────┘
                     │
                     ▼
┌─────────────────────────────────────────────┐
│ Calculate a distribution ratio based on     │
│ measured profiling information from the CPU │
│ profiling threads and from the GPU proxy    │
│ profiling thread                            │
│ 440                                         │
└─────────────────────────────────────────────┘
                     │
                     ▼
┌─────────────────────────────────────────────┐
│ Distribute a remaining portion of the work  │
│ items from the pool between the CPUs and    │
│ the GPU based on the distribution ratio     │
│ 450                                         │
└─────────────────────────────────────────────┘
```

ADAPTIVE SCHEDULING FOR TASK ASSIGNMENT AMONG HETEROGENEOUS PROCESSOR CORES

CROSS-REFERENCE TO RELATED APPLICATION(S)

This application is a Continuation of U.S. application Ser. No. 14/583,247 filed Dec. 26, 2014, which claims the benefit, under 35 USC 119(e), of U.S. Provisional Application Ser. No. 62/041,321, filed Aug. 25, 2014, all of which are incorporated herein by reference in their entirety.

FIELD

The present disclosure relates to processor core task assignment, and more particularly, to adaptive scheduling for task assignment among heterogeneous processor cores.

BACKGROUND

Heterogeneous systems are becoming increasingly common in most market segments including mobiles, tablets, laptops, desktops, and servers. These systems typically incorporate some types of specialized processing cores along with the more general-purpose Central Processing Unit (CPU) cores. The specialized processing cores may include, for example, cores in Graphics Processing Units (GPUs), fixed function hardware cores in Systems on a Chip (SoCs), small cores in SoCs, and specialized cores in servers. While the specialized cores are generally well-suited to perform their domain-specific tasks, they may also be used to perform other more general-purpose tasks. Simultaneously utilizing these specialized cores along with CPU cores often results in significant improvements in performance and energy efficiency making it an attractive option for an application developer trying to maximize benefits from the hardware.

Finding a good partitioning of work between the cores (e.g., load-balancing), however, is generally a complex problem. The division of work between the CPU and a GPU, for example, has been the subject of numerous studies. Existing techniques typically fall into three broad categories, each of which may have associated drawbacks:

(1) Off-line training—A runtime scheduling algorithm is trained on an input data set offline (e.g., a training run execution), and the information obtained is subsequently used during the real runtime execution. The success of this approach depends to a large extent on how accurately the training reflects what occurs during the real runtime execution. Moreover, the training must be repeated for each new platform.

(2) Use of a performance model—Accurate performance models are difficult to construct, particularly for irregular workloads (e.g., where distribution of the work can vary significantly between processors) since runtime behavior is highly dependent on characteristics of the input data.

(3) Extend standard work-stealing with restrictions on stealing—Since the GPU typically cannot initiate communication with the CPU, addressing the problem of load imbalance may be limited to use of extensions where work is pushed to GPUs (e.g., work-stealing). Such approaches incur overheads on CPU execution since the CPU has to act on behalf of the GPU workers or threads.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for adaptive scheduling of task assignment among heterogeneous processor cores. In particular, scheduling techniques are disclosed for systems with integrated CPU-GPU processors that employ online profiling (e.g., at run-time, in contrast to techniques that use off-line training, prior to run-time). Embodiments of the present disclosure may be configured to profile some fraction of the work items on each processor and to calculate a desired distribution of the workload between the CPU and GPU based on the measured device execution rates (and other metrics) obtained through profiling. CPU Profiling threads may execute on each CPU, and an additional GPU proxy profiling thread may execute on one of the CPUs. Profiling may be completed when one of the profiling threads completes, as will be described in greater detail below. Additionally, work-stealing queues may be associated with each CPU to more efficiently distribute workload. Because the system is implemented in a run-time fashion, it does not require any prior training and introduces no additional overhead when applied to applications with new data sets or to new platform configurations.

Figure 1:
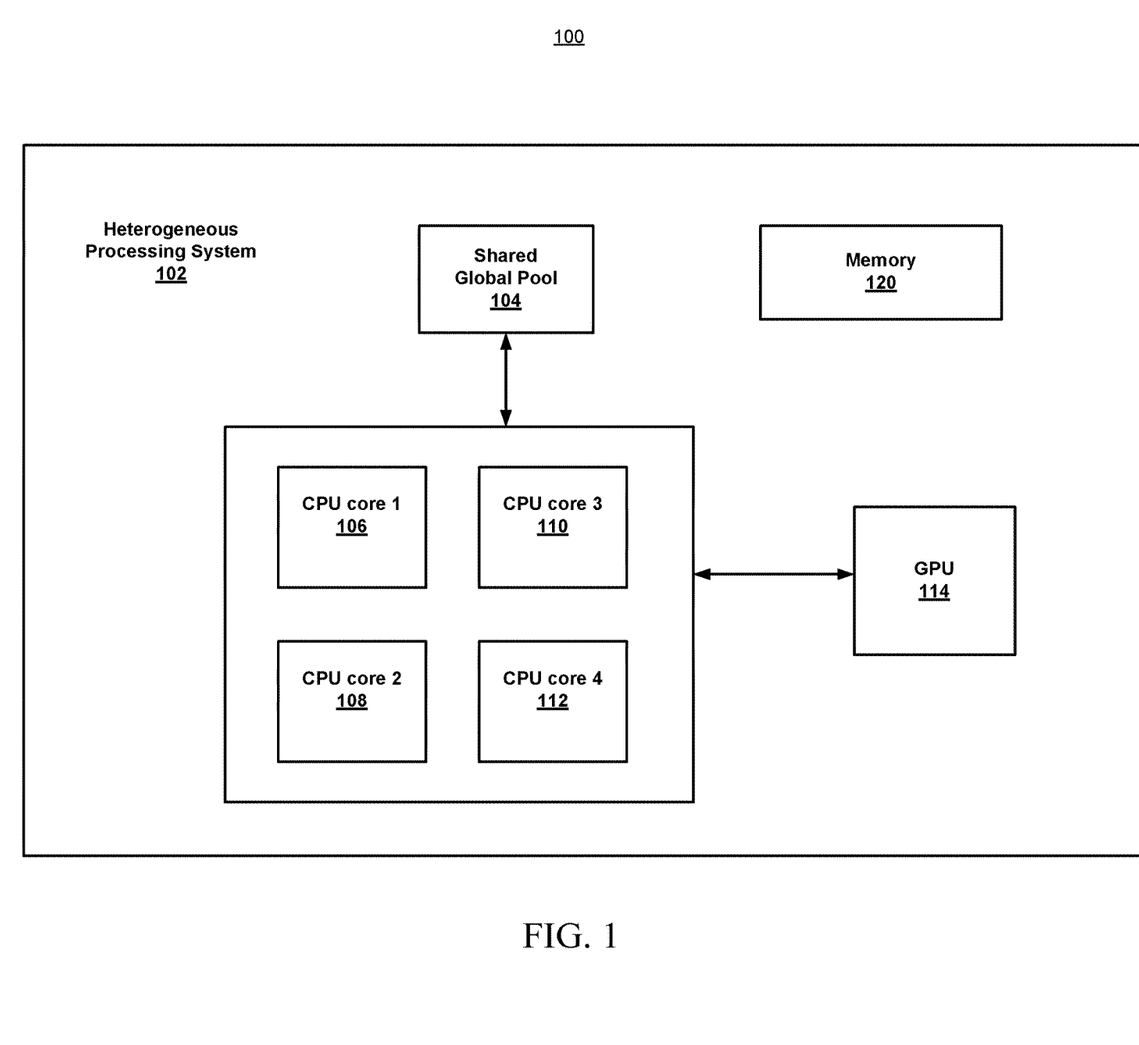
FIG. 1 illustrates a top level system diagram of an example embodiment consistent with the present disclosure.

FIG. 1 illustrates a top level system diagram 100 of one example embodiment consistent with the present disclosure. A heterogeneous processing system 102 is shown to include a number of CPUs or CPU processing cores 106, 108, 110, 112 as well as a GPU 114. The GPU may be any type of auxiliary or accelerator processor. For example, the GPU may be configured to perform parallel operation with greater efficiency than the CPUs. In some embodiments, these processors may be integrated into a System on a Chip (SoC). An integrated GPU may substantially reduce the cost of CPU-GPU data communication, compared to systems with discrete GPUs, thus allowing work sharing between the CPU and GPU at a finer level of granularity.

A shared global pool of work items 104 is also illustrated and is configured to provide work-items to be distributed for execution among the processors 106, . . . 114. The shared global pool of work items 104 may be stored in memory module 120. In some embodiments, the work items may be in the form of the elements of a parallel iteration space associated with a data-parallel kernel, for example:

```
// for a parallel iteration space of N by M data elements
for (i = 0; i < N; i++) {
    for (j = 0; j < M; j++) {
        // data parallel kernel performs work on data elements
        Result[i, j] = perform_work(i, j);
    }
}
```

The kernel, in this example the function perform_work( ), may be set of operations or processor instructions to perform a task using the data elements that are organized into an N by M parallel iteration space. The work may thus be performed in parallel, on segments of the data. For example, there may be N invocations of the kernel, each associated with one of N segments of the data, where each invocation performs M of the computations on that segment. The invocations of the kernel may be distributed or scheduled among the processors 106, . . . 114 based on the profiling techniques described herein.

The CPU and GPU of a heterogeneous system generally have different device characteristics. CPU cores typically provide out-of-order instruction execution capability, sophisticated branch predictors, and use relatively deep cache hierarchies to reduce memory access latency. GPU cores, on the other hand, typically execute instructions in-order, devote their hardware resources to a relatively larger number of arithmetic-logic units (ALUs), and hide memory latency by switching between threads. This dissimilarity may lead to significant differences in execution performance. Certain applications may execute significantly faster on one device than on another. As a result, executing even a relatively small amount of work on the slower device may adversely impact performance. Thus, the profiling-based runtime scheduling system described herein is configured to avoid forcing a faster device (often the GPU) to wait idly, after completion of its portion of the profiling workload, while a second, slower device (often the CPU) finishes its profiling workload.

Figure 2:
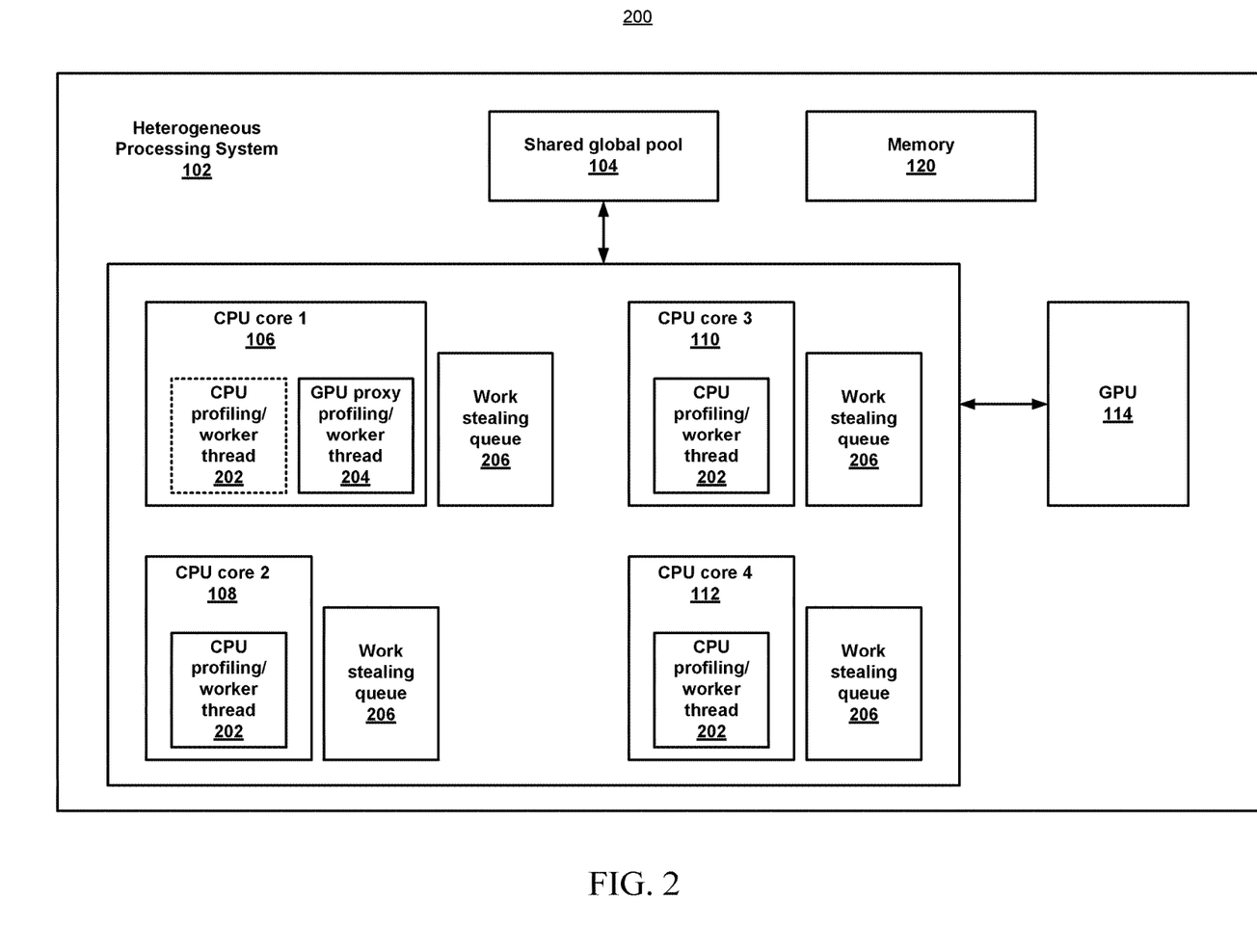
FIG. 2 illustrates a system block diagram of an example embodiment consistent with the present disclosure.

FIG. 2 illustrates a system block diagram 200 of an example embodiment consistent with the present disclosure. Embodiments of the scheduling system are described in the context of heterogeneous systems comprising any number of CPUs and GPUs, for example four CPU cores 106, 108, 110, 112 and one GPU 114 as shown in FIG. 2. The techniques, however, are applicable to any heterogeneous System on a Chip (SoC) or other system with CPUs and accelerators.

Each CPU core is shown to include a CPU profiling/worker thread (or module) 202. One of the CPU cores, 106, is shown to additionally include a GPU proxy profiling/worker thread (or module) 204, and for this reason the scheduling system may be described as asymmetric (i.e., not all of the CPU cores host a GPU proxy thread). In some embodiments, the CPU core that hosts the GPU proxy profiling/worker thread 204 may be configured to not also host the CPU profiling/worker thread 202 (unless, for example, there is an oversubscription at run-time). Thus, in FIG. 2, the CPU profiling/worker thread 202 associated with CPU core 1 106 is shown as a dotted line to indicate an optional presence in some embodiments.

Memory 120 may be configured to store work-stealing queues (e.g., data structures) 206 associated with each CPU core, the operations of which will be described below.

The scheduling system may be configured to operate in two phases: a profiling phase and an execution phase. In the profiling phase, a fixed quantity (first portion) of work-items (corresponding to a fixed profiling size fp, to be described below) is selected and fetched from the shared global pool 104 by the GPU proxy profiling/worker thread 204 and offloaded to the GPU 114 for execution. The GPU proxy profiling/worker thread 204 measures or collects profiling information related to the GPU execution of those offloaded work-items. In parallel, the CPU profiling/worker threads 202 may fetch a second portion of work-items from the shared global pool 104 for execution on the CPU associated with that profiling/worker thread and measures or collects profiling information on the execution of those work-items local to that CPU. This per-thread profiling information may include execution time, energy consumption, memory usage characteristics, and/or other suitable metrics.

When the GPU proxy profiling/worker thread 204 completes the GPU profiling phase, it may perform the following operations:

1. Computation of the CPU-GPU work distribution ratio based on its own GPU profiling information and the profiling information from each CPU profiling thread 202.

2. Fetch any remaining work-items (remaining portion) from the shared global pool 104.

3. Assign a portion of the fetched remaining work items to one of the CPU work-stealing queues 206. The portion may be based on the CPU-GPU distribution ratio computed in operation 1. Other CPU profiling/worker threads 202 (e.g., on other CPU cores 108, 110, 112) may subsequently steal work from this work-stealing queue 206 so that the work is shared or balance among the CPU cores.

4. Offload the rest of the fetched work-items (from operation 2) to the GPU 114.

In some embodiments, machine learning techniques may be employed to predict the occurrence of the relatively unusual situation where one or more of the CPU profiling threads 202 may complete their profiling tasks before the GPU proxy profiling/worker thread 204 completes. In such a case, GPU profiling may be avoided.

The execution phase may follow the profiling phase. When each CPU profiling/worker thread 202 detects that there is no work remaining in the shared global pool 104 (for example, since the GPU proxy profiling/worker thread 204 emptied the pool), that CPU profiling/worker thread 202 then switches to a work-stealing mode. In work-stealing mode, each CPU profiling/worker thread 202 fetches work-items, for execution, from one of the work-stealing queues 206 associated with one of the other CPU cores. Performing work-stealing in this manner may be more efficient than having each CPU profiling/worker thread 202 fetch work-items one at a time from the shared global pool 104 because the work is distributed more evenly and less contention is generated for the single lock that may be employed to protect the pool 104. Load balancing among the CPU profiling/worker threads 202 is also improved. Each CPU profiling/worker thread 202 may continue to execute work-items until all CPU work is completed. Meanwhile, the GPU proxy profiling/worker thread 204 waits until the GPU finishes executing the portion of the work that was offloaded to it.

The choice of the profiling size fp may be important for full utilization of available parallelism on the GPU. For example, on an integrated GPU that has 20 execution units (EUs), with 7 hardware threads per EU and each thread being configured for 16-way single-instruction-multiple-data (SIMD), a total of 2240 work-items may execute in parallel. In this case, fp may be chosen as 2048 (a nearest power of 2 to the total number of work-items that may be executed in parallel). In some embodiments, where the GPU uses OpenCL (a software framework for parallel computing across heterogeneous platforms), this information can be obtained by querying the GPU device using OpenCL flags such as     CL_DEVICE_MAX_COMPUTE_UNITS,
    CL_DEVICE_MAX_WORK_GROUP_SIZE, and
    CL_DEVICE_NATIVE_VECTOR_WIDTH_INT.

If both the CPUs 106, . . . 112 and GPU 114 are kept busy during profiling, by having a sufficient number of parallel iterations to execute, then the profiling phase may reduce the overhead to near zero. In some embodiments, this overhead may be limited to the relatively few arithmetic operations associated with calculating the CPU-GPU work distribution ratio, which is typically negligible compared to the total execution time of an application. The CPU profiling/worker thread 202 may continue to work off the shared global pool 104 while the GPU proxy profiling/worker thread 204 offloads computations to the GPU 114. Once the GPU finishes, the GPU proxy profiling/worker thread 204 will compute the CPU-GPU distribution ratio, distribute work, and then both the CPUs and the GPU threads may immediately begin the execution phase.

The decision to start the profiling phase of the scheduling process with data from the shared global pool 104 rather than the work-stealing queues 206 may be advantageous since there is no prior knowledge, at the beginning of work distribution, of how to partition work among the CPU cores and the GPU. For example, with irregular applications (where some segments of the application have many more computations than other segments), it would likely be costly to partition the work equally, up front, into the work-stealing queues 206 without knowing the characteristics of the application's irregular behavior.

Figure 3:
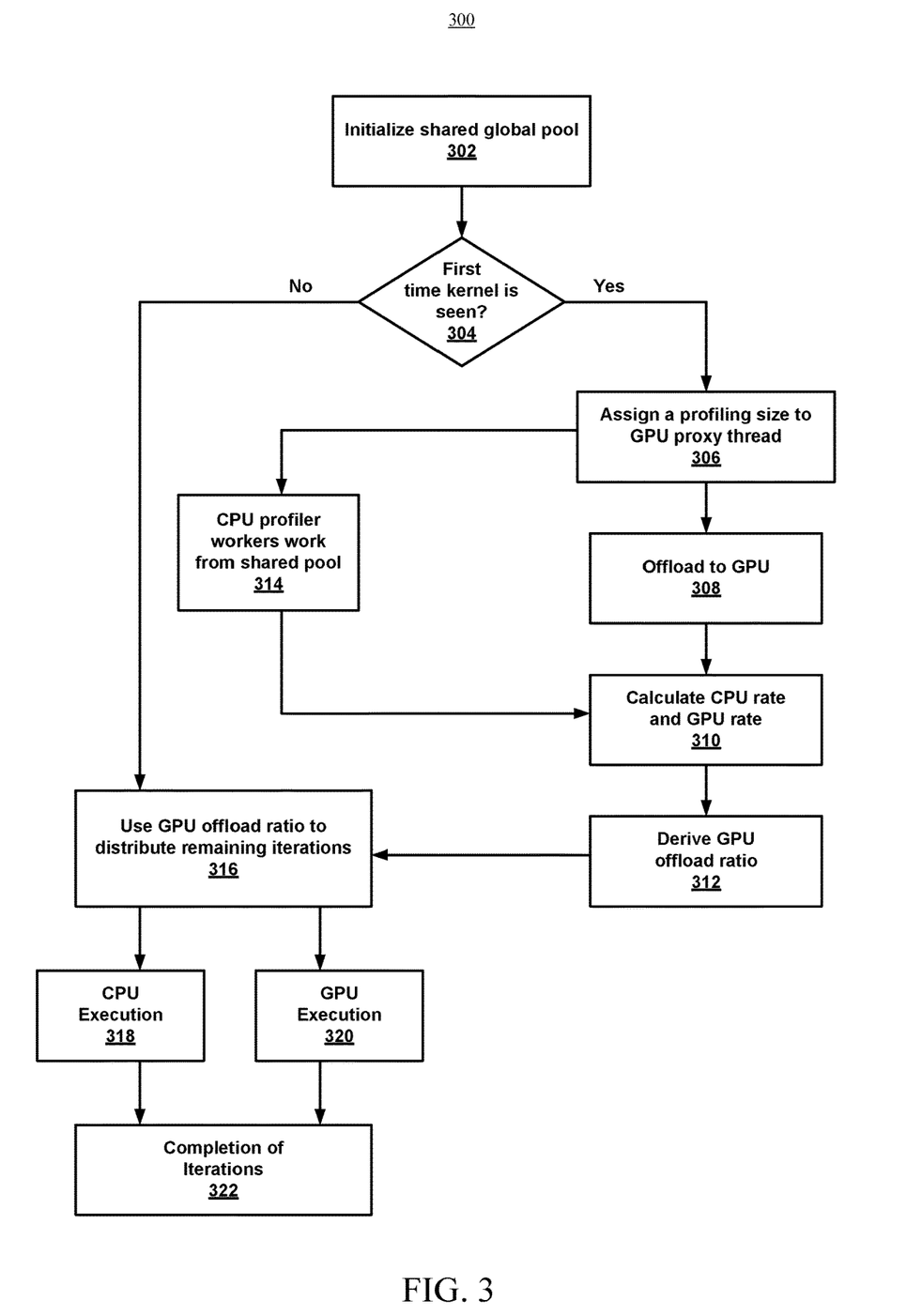
FIG. 3 illustrates a flowchart of operations of one example embodiment consistent with the present disclosure.

FIG. 3 illustrates a flowchart of operations 300 of one example embodiment consistent with the present disclosure. The operations provide a method for adaptive scheduling of task assignment among heterogeneous processor cores. At operation 302, the shared global pool 104 is initialized with work items. The work items may be in the form of a parallel iteration space associated with a data-parallel kernel. At operation 304, a determination is made as whether this kernel has been previously profiled. If so, then at operation 306, a profiling size is assigned to the GPU proxy profiling/worker thread 204 and a quantity of work-items (based on the profiling size) is selected and fetched from the shared global pool 104 by the GPU proxy profiling/worker thread 204. These work-items are then offloaded, at operation 308, to the GPU 114 for execution. In parallel, at operation 314, the CPU profiling/worker threads 202 fetch remaining work-items from the shared global pool 104 for execution on the associated CPU.

At operation 310, the CPU execution rate (and/or other profiling metrics) is calculated by the CPU profiling/worker threads 202 (as executed in operation 314) and the GPU execution rate (and/or other profiling metrics) is calculated by the GPU proxy profiling/worker thread 204 (as executed in operation 308). At operation 312, the GPU offload ratio is derived from those rate calculations. For example, if the GPU execution rate is determined to be twice that of the CPU execution rate, then the GPU offload ratio could be set to approximately a factor of 2, meaning that the GPU would be given twice the amount of work as the CPUs.

At operation 316, after the kernel has been profiled, the GPU offload ratio is used to distribute the remaining work (iterations) from the shared global pool 104 to the CPUs and the GPU. At operation 318, the CPUs execute their assigned workload, including work-stealing from other CPUs when their own tasks are completed. At operation 320 the GPU executes its assigned workload. At operation 322, all iterations are completed.

Although this asymmetric profiling approach substantially reduces overhead in the profiling phase, compared to existing profiling based scheduling algorithms, there may still be some overhead incurred during the execution phase if the iterations that were executed in the profiling phase were not representative of the entire iteration space. Such execution irregularity can cause a workload imbalance. Additionally, there may be situations where a data-parallel kernel is invoked several times, but the optimal CPU-GPU distribution ratios differ from one invocation to another. In some embodiments, the following additional adaptive strategies may be employed by the asymmetric profiling system to address these problems.

(A) Load Imbalance

Since profiling is performed only one time, the CPU-GPU distribution ratio that is chosen may not be accurate for some classes of workload that exhibit load imbalance. These classes may include workloads that perform graph algorithms like breadth first search (BFS), depth first search (DFS), and Delauny mesh refinement. To address this problem, in some embodiments the profiling phase may be repeated until a termination condition is reached, after which the benefit of further re-profiling is likely to diminish. Repeated profiling to adapt the distribution ratio may improve the characterization of the application's behavior. Examples of three possible termination schemes include:

(1) Convergence-based termination: Profiling is repeated until two successive profiling phases result in CPU-GPU distribution ratios that differ by less than a threshold value, which is to say that they converge. For example, the convergence criteria may be selected as a relative difference between successive distribution ratios of approximately 5 percent or less. This termination criterion may be advantageous in cases where the distribution ratio stabilizes after some period of execution.

(2) Size-based termination: Profiling is repeated until a certain portion of the iteration space is completed, for example, half of the iteration space. This strategy may work well for many irregular applications. Although re-profiling imposes an overhead, that overhead may be amortized by obtaining an improved CPU-GPU distribution ratio.

(3) Linear-based termination: Profiling is repeated a fixed number of times, after which a linear regression is computed for the key optimization metric (typically execution time or energy use) as a function of the iteration number. This computation may be based on any suitable method including, for example, least-squares minimization. If there is an acceptable linear approximation of the optimization metric (e.g., the linear fitting error is below a threshold), then the slope of the line may be used to predict the best future CPU-GPU distribution ratio.

While the profiling phase is repeated, the CPUs and GPU may be kept busy since no processor is waiting for any other processor to complete. Thus, low overhead is maintained during re-profiling.

(B) Multiple Invocations per Kernel

In applications where the kernel is invoked repeatedly (e.g., a data-parallel kernel is invoked inside a for-loop), the calculated distribution ratio may vary with each invocation. In some embodiments, the following adaptive strategy may be employed to address this issue. The first invocation may be used as an initial profile run to obtain a CPU-GPU distribution ratio. During subsequent runs, whenever work-items are executed on one or both processors, the asymmetric profiling system may observe the per-processor execution rates and update the running CPU-GPU distribution ratio according to one of the following two update strategies:

(1) Previous: The processor execution rates found for the previous invocation are used to determine the CPU-GPU distribution ratio of the current invocation.

(2) Sample-weighted: A running distribution ratio may be computed each time as a weighted average of the previously used running distribution ratio and a ratio calculated from processor execution rates generated from the most recent iteration. In some embodiments, the current and previous ratios may be weighted by factors alpha and (1-alpha) respectively, where alpha is a chosen from the range of 0 to 1 to select the relative weight given to current data over historical data.

Thus, embodiments of the present disclosure for adaptive scheduling using online profiling, as described herein, may achieve improved results including the following:

(1) Available system resources are utilized with near zero additional overhead to more fully exploit the benefits of heterogeneous processing. Existing profiling algorithms typically execute a fixed set of iterations to profile on multiple processors to determine their effectiveness. The problem with this approach is that processors other than the slowest processor are forced to wait, which may introduce delay in the system. In contrast, embodiments of the present disclosure may employ an asymmetric scheduling technique for heterogeneous core assignment that eliminates these overheads by using the faster of multiple devices to determine how long to run the system in profile mode. Once the faster device finishes executing the profiling work assigned to it, it signals other devices to stop profiling. In this way the system does not have to wait for a slower device during profiling and thus incurs reduced profiling overhead.

(2) The profiling may measure, more accurately, the execution ratio of different processors, which might otherwise be difficult in the presence of load imbalance that often occurs in irregular applications (e.g., where the required workload may vary significantly between processors). Adaptive strategies are provided to address these potential load imbalances caused by irregular kernels.

(3) Diverse types of workloads may be effectively handled including those with multiple kernels and multiple invocations of the same kernel, where each invocation behaves differently. Adaptive strategies are provided to account for the possibility that optimal execution might be achieved with different CPU/GPU partitioning for each kernel invocation or for different kernels. Additionally, multiple invocations of the same kernel may be handled by accumulating work partitioning information across the invocations.

Figure 4:
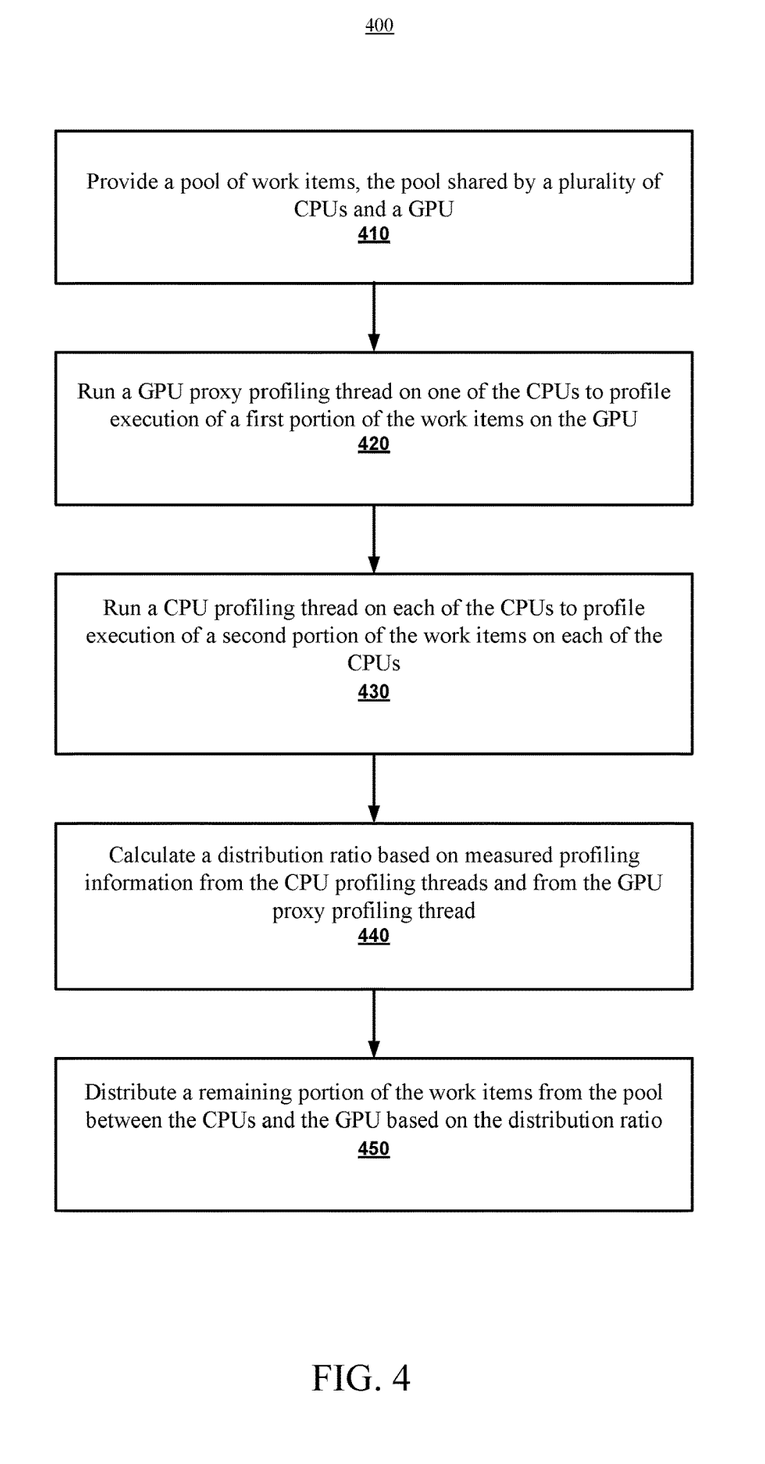
FIG. 4 illustrates a flowchart of operations of another example embodiment consistent with the present disclosure.

FIG. 4 illustrates a flowchart of operations 400 of another example embodiment consistent with the present disclosure. The operations provide a method for adaptive scheduling of task assignment among heterogeneous processor cores. At operation 410, a pool of work items is provided. The pool is shared by a plurality of central processing units (CPUs) and a graphics processing unit (GPU). At operation 420, a GPU proxy profiling thread is run on one of the CPUs to profile execution of a first portion of the work items on the GPU. At operation 430, a CPU profiling thread is run on each of the CPUs to profile execution of a second portion of the work items on each of the CPUs. At operation 440, a distribution ratio is calculated based on measured profiling information from the CPU profiling threads and from the GPU proxy profiling thread. At operation 450, a remaining portion of the work items from the pool is distributed between the CPUs and the GPU based on the distribution ratio.

Figure 5:
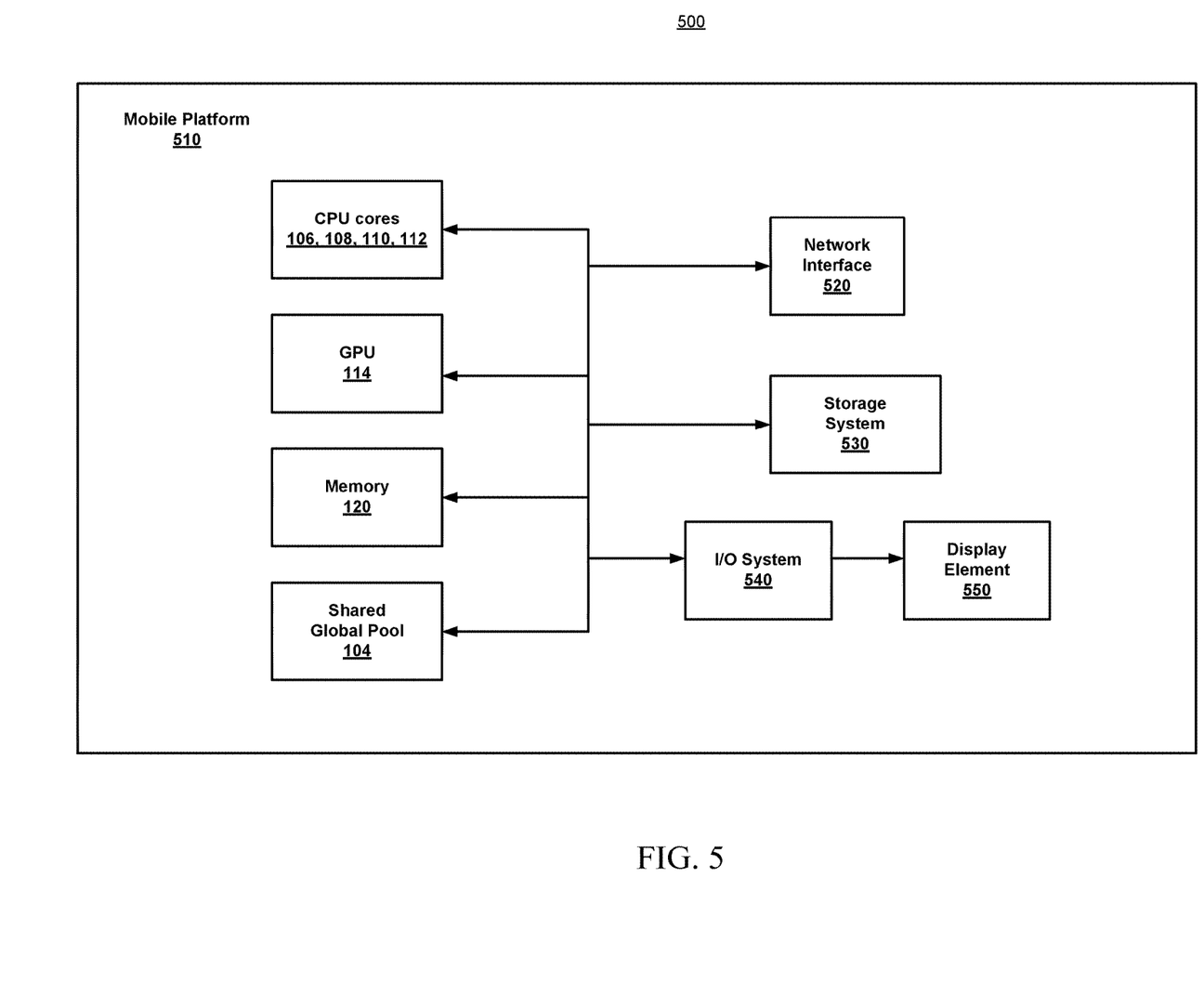
FIG. 5 illustrates a system diagram of a platform of another example embodiment consistent with the present disclosure.

FIG. 5 illustrates a system diagram 500 of one example embodiment consistent with the present disclosure. The system 500 may be a mobile platform 510 or computing device such as, for example, a smart phone, smart tablet, personal digital assistant (PDA), mobile Internet device (MID), convertible tablet, notebook or laptop computer, or any other suitable device. It will be appreciated, however, that embodiments of the system described herein are not limited to mobile platforms, and in some embodiments, the system 500 may be a workstation, desktop computer, node in a compute cluster or one blade in a cloud or datacenter server. The device may generally present various interfaces to a user via a display element 550 such as, for example, a touch screen, liquid crystal display (LCD) or any other suitable display type.

The system 500 is shown to include one or more processors, including CPU cores 106, ... 112, and GPU 114 which may be configured as heterogeneous processors. In some embodiments, the processors may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multi-threaded cores in that they may include more than one hardware thread context (or "logical processor") per core.

The system 500 is shown to also include a memory 120 and a shared global pool of work items 104, as described previously. The memory 120 may be coupled to the processors and, in some embodiments, may be configured to host the shared global pool 104. In some embodiments, for example, the shared global pool 104 may be included in the memory 120, while in other embodiments, the shared global pool 104 may be implemented as a separate memory. The memory 120 may be any of a wide variety of memories (including various layers of memory hierarchy and/or memory caches) as are known or otherwise available to those of skill in the art. It will be appreciated that the processors and memory may be configured to store, host and/or execute one or more operating systems, kernels, user applications or other software modules, which may execute in any of a number of available privilege modes, including, for example, VMX root mode, ring 0 mode and ring 3 mode. These applications may include, but not be limited to, for example, any type of computation, communication, data management, data storage and/or user interface task. In some embodiments, these applications may employ or interact with any other components of the mobile platform 510.

System 500 is also shown to include a storage system 530, for example a hard disk drive (HDD) or solid state drive (SSD).

System 500 is also shown to include an input/output (IO) system or controller 540 which may be configured to enable or manage data communication between processors and other elements of system 500 or other elements (not shown) external to system 500.

System 500 is also shown to include network interface module 520 which may include wireless communication capabilities, such as, for example, cellular communications, Wireless Fidelity (WiFi), Bluetooth®, and/or Near Field Communication (NFC). The wireless communications may conform to or otherwise be compatible with any existing or yet to be developed communication standards including past, current and future version of Bluetooth®, Wi-Fi and mobile phone communication standards.

It will be appreciated that in some embodiments, the various components of the system 500 may be combined in a system-on-a-chip (SoC) architecture. In some embodiments, the components may be hardware components, firmware components, software components or any suitable combination of hardware, firmware or software.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as, for example, processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An application or "app" may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, devices, methods and computer readable media for adaptive scheduling of task assignment among heterogeneous processor cores. The following examples pertain to further embodiments.

According to Example 1 there is provided a system for workload scheduling. The system may include a plurality of central processing units (CPUs); a graphics processing unit (GPU); and a memory module configured to store a pool of work items, the pool shared by the CPUs and the GPU. The system of this example may also include a GPU proxy profiling module, associated with one of the CPUs, configured to profile execution of a first portion of the work items on the GPU. The system of this example may further include a plurality of CPU profiling modules, each associated with one of the CPUs, configured to profile execution of a second portion of the work items on each of the CPUs. The measured profiling information from the CPU profiling modules and from the GPU proxy profiling module is used to calculate a distribution ratio for execution of a remaining portion of the work items between the CPUs and the GPU.

Example 2 may include the subject matter of Example 1, and the measured profiling information includes execution time, energy consumption and/or memory usage characteristics.

Example 3 may include the subject matter of Examples 1 and 2, and the first portion size is based on properties of the GPU related to a maximum number of work-items that may be executed in parallel on the GPU.

Example 4 may include the subject matter of Examples 1-3, and the memory is further configured to store a plurality of work-stealing queues, each queue associated with one of the CPUs.

Example 5 may include the subject matter of Examples 1-4, and the GPU proxy profiling module is further configured to distribute the remaining portion of the work items between the work-stealing queues and the GPU.

Example 6 may include the subject matter of Examples 1-5, and the GPU proxy profiling module and the CPU profiling modules are further configured to repeat the profiling execution until the calculated distribution ratio converges to less than a threshold value.

Example 7 may include the subject matter of Examples 1-6, and the GPU proxy profiling module and the CPU profiling modules are further configured to repeat the profiling execution and update the distribution ratio as a weighted average of previously calculated distribution ratios.

Example 8 may include the subject matter of Examples 1-7, and the CPU and the GPU are integrated in a System on a Chip (SoC).

Example 9 may include the subject matter of Examples 1-8, and the system is a smart phone, smart tablet, notebook, laptop computer, compute cluster node or cloud/datacenter server blade.

According to Example 10 there is provided at least one computer-readable storage medium having instructions stored thereon which when executed by a processor result in the following operations for adaptive scheduling of a workload. The operations may include providing a pool of work items, the pool shared by a plurality of central processing units (CPUs) and a graphics processing unit (GPU); running a GPU proxy profiling thread on one of the CPUs to profile execution of a first portion of the work items on the GPU; running a CPU profiling thread on each of the CPUs to profile execution of a second portion of the work items on each of the CPUs; calculating a distribution ratio based on measured profiling information from the CPU profiling threads and from the GPU proxy profiling thread; and distributing a remaining portion of the work items from the pool between the CPUs and the GPU based on the distribution ratio.

Example 11 may include the subject matter of Example 10, and the measured profiling information includes execution time, energy consumption and/or memory usage characteristics.

Example 12 may include the subject matter of Examples 10 and 11, and the first portion size is based on properties of the GPU related to a maximum number of work-items that may be executed in parallel on the GPU.

Example 13 may include the subject matter of Examples 10-12, further including distributing the remaining portion of the work items between the GPU and a plurality of work-stealing queues, each queue associated with one of the CPUs.

Example 14 may include the subject matter of Examples 10-13, further including repeating the profiling execution until the calculated distribution ratio converges to less than a threshold value.

Example 15 may include the subject matter of Examples 10-14, further including repeating the profiling execution and updating the distribution ratio as a weighted average of previously calculated distribution ratios.

According to Example 16 there is provided a method adaptive scheduling of a workload. The method may include providing a pool of work items, the pool shared by a plurality of central processing units (CPUs) and a graphics processing unit (GPU); running a GPU proxy profiling thread on one of the CPUs to profile execution of a first portion of the work items on the GPU; running a CPU profiling thread on each of the CPUs to profile execution of a second portion of the work items on each of the CPUs; calculating a distribution ratio based on measured profiling information from the CPU profiling threads and from the GPU proxy profiling thread; and distributing a remaining portion of the work items from the pool between the CPUs and the GPU based on the distribution ratio.

Example 17 may include the subject matter of Example 16, and the measured profiling information includes execution time, energy consumption and/or memory usage characteristics.

Example 18 may include the subject matter of Examples 16 and 17, and the first portion size is based on properties of the GPU related to a maximum number of work-items that may be executed in parallel on the GPU.

Example 19 may include the subject matter of Examples 16-18, further including distributing the remaining portion of the work items between the GPU and a plurality of work-stealing queues, each queue associated with one of the CPUs.

Example 20 may include the subject matter of Examples 16-19, further including repeating the profiling execution until the calculated distribution ratio converges to less than a threshold value.

Example 21 may include the subject matter of Examples 16-20, further including repeating the profiling execution and updating the distribution ratio as a weighted average of previously calculated distribution ratios.

According to Example 22 there is provided a system for adaptive scheduling of a workload. The system may include means for providing a pool of work items, the pool shared by a plurality of central processing units (CPUs) and a graphics processing unit (GPU); means for running a GPU proxy profiling thread on one of the CPUs to profile execution of a first portion of the work items on the GPU; means for running a CPU profiling thread on each of the CPUs to profile execution of a second portion of the work items on each of the CPUs; calculating a distribution ratio based on measured profiling information from the CPU profiling threads and from the GPU proxy profiling thread; and means for distributing a remaining portion of the work items from the pool between the CPUs and the GPU based on the distribution ratio.

Example 23 may include the subject matter of Example 22, and the measured profiling information includes execution time, energy consumption and/or memory usage characteristics.

Example 24 may include the subject matter of Examples 22 and 23, and the first portion size is based on properties of the GPU related to a maximum number of work-items that may be executed in parallel on the GPU.

Example 25 may include the subject matter of Examples 22-24, further including means for distributing the remaining portion of the work items between the GPU and a plurality of work-stealing queues, each queue associated with one of the CPUs.

Example 26 may include the subject matter of Examples 22-25, further including means for repeating the profiling execution until the calculated distribution ratio converges to less than a threshold value.

Example 26 may include the subject matter of Examples 22-25, further including means for repeating the profiling execution and updating the distribution ratio as a weighted average of previously calculated distribution ratios.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for multi-processor workload scheduling, said system comprising:
    a plurality of first processing units having a first type of processor circuitry; and
    at least one additional processing unit having a second type of processor circuitry that differs from the first type of processor circuitry;
    wherein one of the first processing units is to execute at least part of an execution profiling thread to generate profile information regarding execution of a first portion of a pool of work items, wherein the pool of work items is shared by the plurality of the first processing units and the at least one additional processing unit, and wherein the first portion of the pool is assigned to the plurality of first processing units;
    wherein another of the first processing units is to execute a proxy profiling thread to:
        generate profile information regarding execution of a distinct second portion of the pool assigned to the at least one additional processing unit;
        calculate, based on at least some of the generated profile information, a distribution ratio for execution of a remaining portion of the pool by the first processing units and the at least one additional processing unit, the distribution ratio determined using the profiling information generated by the execution profiling thread and the profiling information generated by the proxy profiling thread; and
        responsive to determining during the execution profiling that sufficient work items remain in the pool for execution by the plurality of first processing units and the at least one additional processing unit, reduce processing overhead from execution of the execution profiling thread and the proxy profiling thread to operations for calculating the distribution ratio.

2. The system of claim 1, wherein the generated profile information for the execution profiling thread and/or the proxy profiling thread includes measured profiling information regarding one or more of a group that includes execution time, energy consumption, or memory usage characteristics.

3. The system of claim 1, wherein the proxy profiling thread is further to distribute the remaining portion of work items between the first processing units and the at least one additional processing unit in accordance with the calculated distribution ratio.

4. The system of claim 1, wherein a size of the second portion is based on properties of the at least one additional processing unit related to a maximum number of work items that may be executed in parallel by the at least one additional processing unit.

5. The system of claim 1, wherein the execution profiling thread and the proxy profiling thread are to continue execution until the calculated distribution ratio converges to less than a defined threshold.

6. The system of claim 1, wherein the plurality of first processing units comprise multiple processing cores of a central processing unit (CPU) and wherein the at least one additional processing unit comprises a graphics processing unit (GPU).

7. The system of claim 6, wherein said CPU and said GPU are integrated in a System on a Chip (SoC).

8. The system of claim 1, further comprising memory circuitry to store the pool of work items.

9. At least one non-transitory computer-readable storage medium having instructions stored thereon which when executed by a processor result in the following operations for adaptive scheduling of a workload, said operations comprising:
   providing a pool of work items for shared execution by a plurality of first processing units having a first type of processor circuitry and at least one additional processing unit having a second type of processor circuitry that differs from the first type of processor circuitry;
   running an execution profiling thread on one or more of the first processing units to generate profile information regarding execution of a first portion of the pool that is assigned to the plurality of first processing units;
   generating, via a proxy profiling thread running on another of the first processing units, profile information regarding execution of a distinct second portion of the pool that is assigned to the at least one additional processing unit;
   calculating, based on at least some of the generated profile information, a distribution ratio for execution of a remaining portion of the pool by the first processing units and the at least one additional processing unit, the distribution ratio determined using the profiling information generated by the execution profiling thread and the profiling information generated by the proxy profiling thread; and
   responsive to determining during the execution profiling that sufficient work items remain in the pool for execution by the plurality of first processing units and the at least one additional processing unit, reducing processing overhead from execution of the execution profiling thread and the proxy profiling thread to operations for calculating the distribution ratio.

10. The non-transitory computer-readable storage medium of claim 9, wherein generating profile information includes generating measured information regarding one or more of a group that includes execution time, energy consumption, or memory usage characteristics.

11. The non-transitory computer-readable storage medium of claim 9, wherein the operations further include distributing the remaining portion of work items between the first processing units and the at least one additional processing unit in accordance with the calculated distribution ratio.

12. The non-transitory computer-readable storage medium of claim 9, wherein a size of the second portion of the pool is based on properties of the at least one additional processing unit related to a maximum number of work items that may be executed in parallel by the at least one additional processing unit.

13. The non-transitory computer-readable storage medium of claim 9, wherein the operations further comprise continuously executing each of the execution profiling thread and the proxy profiling thread until the calculated distribution ratio converges to less than a defined threshold.

14. The non-transitory computer-readable storage medium of claim 9, wherein the plurality of first processing units comprise multiple processing cores of a central processing unit (CPU) and wherein the at least one additional processing unit comprises a graphics processing unit (GPU).

15. The non-transitory computer-readable storage medium of claim 9, wherein the operations further comprise storing the pool of work items via memory circuitry communicatively coupled to the plurality of first processing units.

16. A method for adaptive scheduling of a multi-processor workload, said method comprising:
   providing a pool of work items for shared execution by a plurality of first processing units having a first type of processor circuitry and at least one additional processing unit having a second type of processor circuitry that differs from the first type of processor circuitry;
   running an execution profiling thread on one or more of the first processing units to generate profile information regarding execution of a first portion of the pool that is assigned to the plurality of first processing units;
   generating, via a proxy profiling thread running on another of the first processing units, profile information regarding execution of a distinct second portion of the pool that is assigned to the at least one additional processing unit;
   calculating, based on at least some of the generated profile information, a distribution ratio for execution of a remaining portion of the pool by the first processing units and the at least one additional processing unit, the distribution ratio determined using the profiling information generated by the execution profiling thread and the profiling information generated by the proxy profiling thread; and
   responsive to determining during the execution profiling that sufficient work items remain in the pool for execution by the plurality of first processing units and the at least one additional processing unit, reducing processing overhead from execution of the execution profiling thread and the proxy profiling thread to operations for calculating the distribution ratio.

17. The method of claim 16, wherein generating profile information includes generating measured information regarding one or more of a group that includes execution time, energy consumption, or memory usage characteristics.

18. The method of claim 16, wherein the operations further include distributing the remaining portion of work items between the first processing units and the at least one additional processing unit in accordance with the calculated distribution ratio.

19. The method of claim 16, wherein a size of the second portion of the pool is based on properties of the at least one additional processing unit related to a maximum number of work items that may be executed in parallel by the at least one additional processing unit.

20. The method of claim 16, wherein the operations further comprise continuously executing each of the execution profiling thread and the proxy profiling thread until the calculated distribution ratio converges to less than a defined threshold.

21. The method of claim 16, wherein the plurality of first processing units comprise multiple processing cores of a central processing unit (CPU) and wherein the at least one additional processing unit comprises a graphics processing unit (GPU).

* * * * *